United States Patent

Patil

[15] 3,635,735
[45] Jan. 18, 1972

[54] PREPARATION OF CONFECTION COATED CHEWING GUM

[72] Inventor: Arvind Shankar Patil, Silver Spring, Md.
[73] Assignee: W. R. Grace & Co., New York, N.Y.
[22] Filed: Apr. 8, 1970
[21] Appl. No.: 26,760

[52] U.S. Cl. ..................................................99/135, 99/166
[51] Int. Cl. ..............................................................A23g 3/30
[58] Field of Search ..............................................99/135, 166

[56] References Cited

UNITED STATES PATENTS 3,262,784  7/1966  Bucher ..................................99/135
3,075,884  1/1963  Bilotti ..............................99/135 X
3,554,767  1/1971  Daum ....................................99/166

Primary Examiner—Raymond N. Jones
Assistant Examiner—J. M. Hunter
Attorney—Eugene M. Bond and Kenneth E. Prince

[57] ABSTRACT

Preparing confection coated gum balls by admixing water-containing saccharides with hot molten gum base, evaporatively cooling gum mass, forming balls, applying confection coatings to gum balls, vacuum drying coated gum balls, applying a finish coating to coated gum balls and thereafter vacuum drying the finish coated gum balls.

6 Claims, No Drawings

PREPARATION OF CONFECTION COATED CHEWING GUM

The present invention relates to an improved process for preparing confection coated chewing gum balls.

Prior to the present invention, conventional preparation of coated chewing gum balls from gum base involved several time-consuming steps. One such step included prolonged (e.g., 1 day) cooling of freshly prepared hot gum base prior to forming an ultimately coatable gum mass by combining the gum base with sugar, corn syrup and optionally with coloring, flavoring and the like. Other time-consuming steps included prolonged aging of gum centers prior to coating and prolonged aging of coated gum balls after application of the coating. Conventional processes for preparing coated gum balls having a plurality of coatings, included prolonged aging after application of each of most coatings. For the purposes of this invention "aging" is defined as becoming suitable for coating or end use by remaining essentially undisturbed for a controlled period of time ranging from about several hours to several days or longer. In commercial practice, the intermediate storage necessitated by these time-consuming steps results in inefficient factory space utilization. It is known that merely shortening the aging period is not an acceptable solution to the problem, because insufficient aging typically results in nonuniform adherence of confection and finish coatings to surfaces thereunder.

It has now been found by the practice of the present invention that excellent coated chewing gum balls may be prepared using an accelerated process which includes evaporative cooling of gum mass initially prepared at an elevated temperature by mixing wet saccharides with molten gum base, and vacuum drying confection-coated rounded gum mass centers. The accelerated process provides a relatively short, coated gum preparation cycle, while eliminating prolonged cooling and aging, without detracting from the effective utility thereof. The present invention has an attendant advantage of substantially reducing coated gum ball factory space requirements.

The aging steps employed in conventional processes for preparation of confection coated chewing gum balls are believed to involve crystallization of sugar. The present invention is based on the novel concept that hastened crystallization of sugar in gum center composition may be effected by (a) adding one or more saccharide components, at least one of which is combined with water, such as corn syrup and table sugar, to gum base at an elevated temperature; and (b) vacuum drying gum centers at various stages of coating.

Generally stated, the present invention provides a novel process for preparing confection coated chewing gum balls which may include mixing a sugar-with-water combination with freshly prepared molten gum base to form a sweetened moisture-containing gum mass. Thereafter, the gum mass may be evaporatively cooled and then formed into low-moisture rounded gum centers. Next, a first substantially uniform confection coating may be applied to the gum centers to form coated gum balls. The once-coated gum balls are thereafter vacuum dried to substantial dryness. A second confection coating may then be applied to the once coated gum balls, if desired. A finish coating is next applied to the confection coated gum balls, and thereafter the finish-coated gum balls are vacuum dried to a moisture content corresponding to suitable chewability for finished gum balls. The vacuum-dried finish-coated gum balls may be found suitable for immediate use, including packaging.

Coated gum balls may be prepared by the present process using almost any of numerous known plastic compositions as gum base. Natural gum, synthetic gum, or combinations of natural and synthetic gums may be used herein as gum base. One such synthetic composition useful herein as gum base is a heat coagulated composition including, as components, styrene-butadiene rubber (SBR) latex, resins, waxes and fatty acids. The SBR-containing gum base may be prepared by admixing the components in a steam-jacketed kettle and cooking in a molten state at a temperature of about 240° to about 250° F. for 2 to 3 hours. The cooked, hot molten gum base is then desirably purified by one or more hot water washes.

The present process may be used to prepare coated gum balls having a variety of gum center compositions prepared by mixing gum base and various water-containing saccharide compositions, including, for example, saccharides having absorbed water, corn syrup, aqueous sucrose solutions and the like. A typical gum center admixture may include, for example, about 17 weight percent of the aforesaid SBR containing gum base and about 83 weight percent of a combination of corn syrup and sugar, exclusive of moisture and coloring, flavoring and like ingredients.

For purposes of illustrating the present invention the following description is given with reference to the aforesaid SBR-containing gum base and the aforesaid typical gum center composition having corn syrup and sugar admixed with the gum base.

In a preferred embodiment of the present process, the gum mass or gum center composition is prepared by admixing sugar and corn syrup with freshly prepared, hot molten gum base. Color and flavor adjuvants may conveniently be added with the sugar and corn syrup. The admixture is cooled during mixing by evaporation of water from the initially hot gum mass. Mixing may be effected using any suitable means, such as a sigma blade mixer. Suitable coating may be effected using the present process when sugar and corn syrup are initially admixed with freshly prepared molten gum base, (i.e., no prolonged cooling or aging of the gum base is required). It is conveniently suitable to effect the mixing in a kettle soon after fresh gum base has been prepared. However, it is recommended that any kettle heating means such as steam, electricity, and the like, be operably disconnected, thereby tending to prevent caramelization during admixing. Desirably, mixing is continued until the gum mass attains substantially uniform, viscous consistency. Suitable mixing time is generally dependent upon gum mass size and upon power and efficiency of the mixer employed. Typically, mixing for one-half hour in a sigma mixer is sufficient. Evaporative cooling during mixing is found to assist in developing the viscosity of the amorphous admixed mass, thereby offering an improvement over gum mass prepared by mixing sugar and corn syrup with gum base treated conventionally, such as by one day cold storage.

The evaporatively cooled amorphous gum mass may then be processed into room temperature rounded gum centers by almost any means known in the art. One such means includes initially extruding the mass into large diameter rods. These rods may be of any suitable diameter for ease of handling, preferably in the range of 3 to 4 inches.

Typically, heat develops during initial extrusion, thereby raising gum center composition temperature. In this event, the rods are next cooled in a short duration cooling step. Suitable cooling has been found to be effected in about one-half hour using a forced air dryer supplied with air at approximately 60° to 70° F. Extruding and air cooling are found, in some instances to further dry gum center composition. The gum ball centers at this stage may be found to have essentially the same setting and viscosity characteristics as are found in gum ball centers conventionally prepared from a gum base which has undergone a one day cold storage step.

The cooled gum ball center rods are next formed into substantially round pellets somewhat smaller than a desired size of finished gum balls. For example, the large rods may be conveniently formed into about 0.25-inch spheroidal pellets using extruder-pelletizer means known in the art. However, gum center size is not critical to this invention.

A first confectionery coating is next applied to the rounded, unaged gum ball centers. Coating may be effected using panning apparatus known in the art. Almost any desired confection coating may be used such as, for example, powdered sugar and like soft coatings, and combination of sugar and corn syrup and like coatings. A typical coating thickness is about 20–30 mils for 0.25-inch diameter centers. However, any suitable coating thickness may be used.

The gum ball centers having a first coating are next vacuum dried. Moderate temperature such as, for example, temperatures in the range of 70° to 75° F. are found suitable for drying. A mild vacuum of approximately 10–20 millimeters of mercury vacuum is found desirable. Generally, vacuum drying for approximately 1½ hours suitably prepares the coated gum balls for end use or further coatings if desired. Gum balls thus prepared are generally characterized by uniform adherence of the coating to the surface thereunder. Coating quality and chewability are typically found superior, or at least comparable, to gum balls produced by conventional processes using extended aging steps.

A second confectionery coating may next be applied to the once coated gum ball centers, if desired. Typically, a second coating of same composition as the first coating is applied, and in a thickness ratio of about 10:1 of first to second coating.

When a desired number of undercoatings have been applied, the gum balls are next coated with an edible finish coat. The finish coat may be applied using panning apparatus and methods known in the art. Typically, a finish coating of gum arabic, shellac, or other similar glaze or gloss coating is applied.

The gum balls having a finish coat are next vacuum dried. Vacuum drying of the finish coated gum balls may be performed at any moderate temperature, desirably at a temperature in the range 70° to about 75° F., and under mild vacuum, typically about 10–20 millimeters of mercury vacuum. Suitable drying is generally found to be effected in about 1½ hours. Gum balls prepared by the above described method may be found to possess smooth coatings, characterized by uniform adherence to surfaces thereunder. Moreover, the gum balls thus produced are ready for packaging with no aging required.

It is emphasized that a gum base need not be freshly prepared for use in the foregoing embodiment. The present invention does, however, avoid the necessity of prolonged cooling of hot freshly prepared gum base prior to addition of sugar and corn syrup.

The aging steps employed in conventional processes for preparation of confection coated chewing gum balls are believed to involve crystallization of sugar. The success of the present invention for preparing coated gum balls without aging, is believed to be the result of hastening crystallization of sugar in gum ball centers by mixing water-containing saccharides or saccharide mixtures with molten gum base at an elevated temperature and vacuum drying confection coated gum center composition.

In a second embodiment of this invention, sugar and corn syrup are initially admixed with gum base which has been previously cooled and set in slabs. A suitable mixer, such as a sigma blade mixer, is used to fluidize such conventionally cooled slabs. Thereafter sugar and corn syrup are added to the fluid mass to form a gum center composition which is then mixed to a desired consistency in accordance with known procedure.

Rounded gum ball centers are then formed by any suitable means such as set forth in the aforesaid preferred embodiment. In the second embodiment, the rounded centers are now vacuum dried to substantial dryness. Typically, suitable drying is effected in about 1 hour in air at 70–75° F. under about 10–20 mm. mercury vacuum, and preferably about 15 mm. mercury. Thereafter, the gum centers are confection coated and otherwise treated in accordance with the process of the preferred embodiment supra.

The second embodiment affords means for preparing coated gum balls from a gum base which has been cooled previously, such as by prior art methods. By vacuum drying conventionally prepared gum centers prior to a first application of confection coating, it is found that suitable coated gum balls may be formed without aging.

A third process embodiment includes adding corn syrup and sugar to a hot gum base with evaporative cooling pursuant to the process outlined in the preferred embodiment above, but does not employ vacuum drying. The third embodiment generally requires approximately 2-day aging steps wherever vacuum drying is employed in the preferred embodiment of this invention. The third embodiment is therefore generally less preferred. However, this embodiment may usefully be employed where it is desired to prepare coated chewing gum balls starting with hot gum base and no suitable vacuum drying means are available.

The shape of gum centers prepared by, and used in, the present process is not critical. However, rounded gum centers which are substantially spherical are generally preferred for ease of preparation and coating, as well as use convenience of gum balls formed therefrom.

The process of the present invention will be further illustrated by the following nonlimiting examples.

EXAMPLE 1

A synthetic gum base was prepared using a known method therefor by initially adding to a steam-jacketed kettle equipped with a sigma blade agitator, an amount of commercially available styrene-butadiene rubber latex including about 16 pounds of latex solids. To the latex were added about 134 pounds of a mixture consisting essentially of substantially equal portions of wax, resin, and fatty acid. The resulting mass was then cooked, with agitation, for 2 hours at 250°±10° F. to form about 150 pounds (dry weight) of hot molten synthetic gum base. The thus formed gum base was thereafter washed 5 times with 200° F. water for substantially complete removal of residual rubber monomer and water-soluble salts which may have been present initially.

Thereafter, 150 pounds of corn syrup containing 20 weight percent water, 602 pounds of powdered sugar, 4 pounds of fruit flavoring and 4 pounds of vegetable coloring were admixed with the freshly prepared, washed gum base to form sweetened gum ball center composition. Substantially uniform composition consistency was effected in about 15 minutes using the sigma blade agitator. No steam was supplied to the kettle jacket, and no caramelization was observed. Evaporative cooling during mixing reduced the temperature of the composition to 100° F. and dried the mass to about 0.5 weight percent moisture.

The slightly moist gum ball center composition was promptly extruded into rods about 3.5 inches in diameter. The rods were directly introduced into a dryer supplied with a forced flow of 70° F. air, wherein the rods were cooled to about 72° F. in about one-half hour. The cooled rods were directly formed into approximately 0.25 inch average diameter spheroidal gum ball centers using an extruder-pelletizer equipped with 0.25-inch diameter die holes. The spheroidal gum ball centers were promptly passed to a rotary rounding machine in which the spheroids were rounded into substantially spherical gum ball centers, approximately 0.25 inch in diameter.

A number of the rounded gum ball centers were promptly coated with 20–30 mils "hard" coating of a combination of sugar and 80 percent corn syrup in water using panning apparatus known in the art. The "hard" coated gum centers were then vacuum dried for 1 hour in air at 72°±3° F. under a 10–20 millimeters of mercury vacuum. The thus treated "hard" coated gum balls were found, upon inspection, to have excellent adhesion of the "hard" coat to the gum ball centers.

Thereafter, the hard coated gum balls promptly received a second "hard" coating of 0.2–0.3 mils using the same composition and apparatus used for applying the first coat. Next the twice "hard" coated gum balls were finish coated in a panning apparatus using a composition consisting essentially of gum arabic, resins and shellac. The finish coated gum balls having the "hard" undercoatings were then vacuum dried for about 1.5 hours in air at 72°±3° F. under 10–20 millimeters of mercury vacuum.

Observations indicated the thus prepared finish coated gum balls to have uniform coating adherence, excellent flavor retention, and good bite characteristics. Moreover, the finished hard coated gum balls were prepared in about 7 hours, including about 2 hours for preparing the synthetic gum base. Conventional processes for preparing related products normally require 3–5 days or more.

EXAMPLE 2

The rounded gum centers of example 1 which remained (after a number were removed for "hard" coating as described in that example) were promptly coated with 2–3 mils "soft" coating of dry powdered sugar using known panning apparatus therefor. The "soft" dry-coated gum balls were promptly vacuum dried, again soft coated, finish coated and again vacuum dried following the example 1 procedure, except substituting dry powdered sugar for the example 1 "hard" coating composition.

The resulting finished soft undercoated gum balls were observed to have excellent coating adherence, good bite characteristics and excellent flavor retention.

EXAMPLE 3

Synthetic chewing gum base was prepared following the procedure therefor of example 1. The chewing gum base was washed 5 times with 200° F. water. The washed gum base was poured into trays and stored for one day in a cold room at approximately 65° F. The thus formed gum base slabs were removed and then plasticized in a sigma-blade mixer. Corn syrup, sucrose, flavoring and coloring ingredients were then admixed with the plasticized gum base. After mixing to substantially uniform consistency, the thus prepared gum ball center composition was extruded, dried and cooled, extruded and pelletized, and rounded into gum ball centers having about 0.25-inch diameter, according to the like steps in the procedure of example 1. A number first samples of the thus prepared gum ball centers were vacuum dried for about 1 hour in air at 72°±3° F. under 15 millimeters of mercury vacuum. The vacuum dried gum centers were coated with 20–30 mils of "hard" confectionery coating of a combination of sucrose and 80 percent corn syrup in water, using known panning apparatus therefor. No aging time was used between rounding and coating the first samples.

These once coated gum centers were found to be characterized by uniform adherence of the coating to the gum center surface thereunder. Samples of the thus coated gum balls were adjudged equivalent, and in some instances superior, in coating quality to once coated gum balls prepared by a conventional related process wherein rounded gum ball centers are aged two days prior to receiving a first coating.

The once coated gum center samples were soon thereafter vacuum dried for about 1 to 1½ hours in air, at 72°±3° F. under about 15 millimeters of mercury vacuum. Soon after vacuum drying, the once "hard" confection coated gum balls were again "hard" coated using 2–3 mils of coating. The twice coated gum balls were soon thereafter finish coated in a panning apparatus, using a composition consisting essentially of gum arabic, resins and shellac. The finish coated gum balls having "hard" undercoatings were soon thereafter vacuum dried for 1–1 1½ hours in air at 72°±3° F. under 15 millimeters of mercury vacuum. Observation of the finish coated gum ball samples indicated suitability for immediate use, including packaging.

The finish coated gum balls having two "hard" undercoatings were found to have excellent bit characteristics, good flavor retention and excellent adhesion of the several coatings to the respective underlying surfaces. The finish coated gum balls were adjudged substantially equivalent, and in some instances superior to finish-coated "hard" undercoat gum balls prepared by a conventional related process which includes 1-day aging between application of "hard" undercoatings and approximately 2 to 3 days aging between application of the finish coat and packaging. Moreover, the finish coated "hard" undercoat chewing gum balls were prepared from gum base slabs in less than 8 hours, while conventional related processes involving aging require up to 5 days or more to prepare usable finish coated chewing gum balls.

EXAMPLE 4

Example 3 was repeated with the exception that two "soft" undercoatings of dry powered sugar were substituted for the "hard" undercoatings used in example 3. Good adherence of the "soft" undercoatings was observed. Flavor retention, bite characteristics and suitability for packaging of the finish coated "soft" undercoat chewing gum balls were adjudged substantially equivalent to the example 3 chewing gum balls.

Examples 5–8

Examples 1–4 are repeated using 10 millimeters of mercury vacuum for the various vacuum drying steps. The results are substantially the same.

Examples 9–12

Examples 1–4 are again repeated using 20 millimeters of mercury vacuum for the various vacuum drying steps. The results are substantially the same.

Examples 13–14

Examples 1–2 are repeated except that corn syrup powdered sugar, fruit flavoring and vegetable coloring are admixed with synthetic gum base at 300° F. at the start of admixing. Substantially the same results are observed. However, more time is required for evaporative cooling although suitable gum center composition consistency is developed faster and with less mixing power demand.

Examples 15–16

Examples 1–2 are repeated using a gum base temperature of 220° F. at the start of admixing. Better flavor retention is observed for these coated gum balls. However, more mixing power is required to achieve similar chewing gum mass consistency in similar mixing time.

It is to be understood that the various components described for use in the products of this invention are those suitable or approved for human consumption.

It is to be understood that the foregoing detailed description is given merely by way of illustration and that various modifications may be made thereto without departing from the spirit or scope of the present invention.

I claim:

1. A process for preparing confection coated gum balls which comprises:
   A. admixing at least one saccharide-containing component with molten gum base to form a saccharide-containing gum mass having a substantially uniform viscous consistency, said saccharide-containing component comprising water in combination with saccharide;
   B. evaporatively cooling said gum mass;
   C. forming the evaporatively cooled gum mass into gum balls; and thereafter
   D. applying at least one confection coating to the gum balls of step C.
   E. vacuum drying the coated gum balls prepared in Step D; thereafter
   F. applying to the vacuum dried gum balls a coating including gum arabic, resin and shellac components; and
   G. vacuum drying the gum balls of step F to form gum ball products.

2. The process of claim 1 wherein admixing of step (A) is effected at a temperature of from about 220° to about 300° F.

3. The process of claim 1 wherein said gum base consists essentially of styrene-butadiene latex, waxes, resins, and fatty acids.

4. The process of claim 1 wherein said vacuum drying in steps (E) and (G) are effected at a temperature of from about 70° to about 75° F.

5. The process of claim 1 wherein said vacuum drying in steps (E) and (G) are effected under a vacuum of from about 10 to about 20 millimeters mercury.

6. The process of claim 1 wherein said vacuum drying time in steps (E) and (G) are from about one-half hour to about 2 hours.

* * * * *